United States Patent [19]  
Olstowski et al.

[11] 4,076,660  
[45] Feb. 28, 1978

[54] NON-ELASTOMERIC RAPID-SETTING POLYURETHANES

[75] Inventors: Franciszek Olstowski, Freeport; Donald Bob Parrish, Lake Jackson, both of Tex.

[73] Assignee: The Dow Chemical Company, Midland, Mich.

[21] Appl. No.: 448,129

[22] Filed: Mar. 4, 1974

[51] Int. Cl.² ............... C08K 5/10; C08L 75/04; C08L 75/08
[52] U.S. Cl. .................. 260/9; 260/31.2 N; 260/31.8 N; 260/31.8 G; 260/31.8 W; 260/77.5 AP
[58] Field of Search .............. 260/31.2 N, 31.8 G, 260/31.8 W, 77.5 AP, 9, 31.8 R, 31.8 N

[56] References Cited  
U.S. PATENT DOCUMENTS

| | | | |
|---|---|---|---|
| 3,726,827 | 4/1973 | Jones et al. | 260/31.8 |
| 3,763,274 | 10/1973 | Wang et al. | 260/31.2 N |
| 3,801,532 | 4/1974 | Olstowski | 260/31.8 R |
| 3,806,486 | 4/1974 | Endriss et al. | 260/31.2 N |

Primary Examiner—Allan Lieberman  
Attorney, Agent, or Firm—James G. Carter

[57] ABSTRACT

Rapid-setting polyurethanes are prepared employing a mixture consisting of an aliphatic monomeric triol and derivatives of propylene glycol having an equivalent weight of less than about 230 as the polyol component therein.

10 Claims, No Drawings

NON-ELASTOMERIC RAPID-SETTING POLYURETHANES

The present invention relates to dense, non-elastomeric, rapid-setting polyurethanes and more particularly pertains to such polyurethanes containing a monomeric aliphatic triol as a polyol component therein.

Non-elastomeric, rapid-setting polyurethanes are known in the art as disclosed, for example, in U.S. Pat. Nos. 3,378,511; 3,746,692; 3,726,827; and in copending applications Ser. No. 366,835, titled "Non-Elastomeric Polyurethane Compositions" filed on, June 4, 1973, by F. Olstowski and D. B. Parrish allowed on Sept. 28, 1973, and now abandoned; Ser. No. 358,245, titled "Rapid-Setting Polyurethanes from Diols and Polyfunctional Isocyanates" filed on May 7, 1973, by F. Olstowski, U.S. Pat. No. 3,801,532; Ser. No. 327,630, titled "Solid, Rapid-Setting, Rigid Polyurethanes" filed on Jan. 29, 1973 by F. Olstowski now abandoned; and Ser. No. 327,718, titled "Solid, Rapid-Setting, Rigid Polyurethanes" filed on Jan. 29, 1973 by F. Olstowski now abandoned.

Attempts to employ monomeric aliphatic triols as the polyol component have failed to produce rapid-setting polyurethanes in that the resultant products cannot be demolded within a period of about 5 minutes after admixture of the components of the compositions.

It has now been discovered that these monomeric aliphatic triols can be employed to produce rapid-setting, non-elastomeric polyurethanes when admixed with a propylene oxide derivative having an OH equivalent weight of less than about 230.

The term non-elastomeric as employed herein means that the resultant polyurethane has a percent elongation of less than about 100%.

The term rapid-setting as employed herein means that the resultant product can be demolded, without the application of an external source of heat, within a period of about 5 minutes measured from the time the components of the composition are blended together.

The present invention is directed to solid, noncellular, rapid-setting, polyurethane products having a density of at least about 1 g/cc resulting from the admixture of a composition comprising:

A. a polyol component consisting of
   1. a liquid, monomeric, aliphatic triol having from about 3 to about 6 carbon atoms or mixtures thereof and
   2. a liquid propylene oxide derivative having at least 2 hydroxyl groups and an OH equivalent weight of less than about 230 preferably less than about 170 or mixtures thereof;

wherein components (A1) and (A2) are present in quantities such that the hydroxyl equivalent ratio of (A1): A2. is from about 0.25:1 to about 2:1, preferably from about 0.5:1 to about 1:1;

B. an organic polyisocyanate;

C. as a modifier substance a liquid ester of a carboxylic acid or mixtures thereof said modifier having a boiling point above about 150° C at atmospheric pressure;

D. a non-amine containing catalyst for urethane formation;

wherein Components (A) and (B) are present in quantities so as to provide an NCO:OH equivalent ratio of from about 0.8:1 to about 1.5:1 and preferably from about 0.95:1 to about 1.25:1; Component (C) is present in quantities of from about 10% to about 40% and preferably from about 15% to about 30% by weight based upon the sum of the weights of Components (A), (B), and (C); and Component (D) is present in quantities of from about 0.001% to about 2% and preferably from about 0.05% to about 1% by weight based upon the sum of the weights of Components (A), (B) and (C).

Suitable substances which can be employed as Component (A1) include the liquid aliphatic triols having from 3 to about 6 carbon atoms such as, for example, glycerine, trimethylol propane, hexanetriol, pentanetriol, butanetriol, mixtures thereof and the like. These liquid triols are free of substituent groups, other that the OH groups, which are reactive with the NCO groups of the organic polyisocyanates and do not contain ether, ester or any internal linkages other than carbon-carbon linkages.

Suitable substances which can be employed as Component (A2) include propylene oxide derivatives having at least 2 hydroxyl groups, at least 1 ether group and an equivalent weight of less than about 230 such as, for example, dipropylene glycol, tripropylene glycol, adducts of propylene oxide with initiator compounds having from 2 to about 8 hydroxyl groups such as for example propylene glycol, glycerine, trimethylolpropane, hexanetriol, pentaerythritol, sucrose, and mixtures thereof and the like, such initiator compounds being free of substituent groups, other than the OH groups, which are reactive with NCO groups.

Suitable polyisocyanates which may be employed as Component (B) in the compositions of the present invention include, for example, any organic polyisocyanate having 2 or more NCO groups per molecule and no other substituents capable of reacting with the hydroxyl groups of the polyoxyalkylene compound. Suitable such polyisocyanates include, for example, 2,4-toluenediisocyanate, 2,6-toluenediisocyanate, hexamethylene diisocyanate, p,p'-diphenylmethanediisocyanate, p-phenylenediisocyanate, hydrogenated methylene diphenyldiisocyanate (e.g. Hylene ®W), naphthalene diisocyanate, dianisidine diisocyanate, polymethylene polyphenylisocyanate, isophorone diisocyanate, mixtures of one or more polyisocyanates and the like.

Other organic polyisocyanates which may suitably be employed and which are to be included in the term organic polyisocyanate include isocyanate terminated prepolymers such as, for example, those prepared from the previously mentioned propylene oxide derivatives and the above mentioned polyisocyanates as well as those prepared from polyisocyanates and other polyols.

These prepolymers contain at least about 10% and preferably 20%–35% free NCO groups by weight.

Suitable esters of a carboxylic acid which may be employed as Component (C) in the present invention include those esters prepared from mono- and polycarboxylic acids having from about 1 to about 20 carbon atoms such as, for example, phthalic, adipic, acetoacetic, formic, acetic, abietic, acids, and the like and wherein the ester portion contains from about 1 to about 20 carbon atoms such as methyl, ethyl, propyl, butyl, hexyl, cyclohexyl, octyl, decyl, dodecyl, eicosyl and the like so long as the carboxylic acid ester has a boiling point above about 150° C and is a liquid at room temperature.

These acid esters may be prepared by condensing an acid having from about 1 to about 20 carbon atoms with a saturated or unsaturated alcohol having from about 1 to about 20 carbon atoms, with the proviso that the ester product is a liquid and has a b.p. >150° C.

Suitable non-amine-containing catalysts for urethane formation include, for example, organo-metal compounds of tin, zinc, lead, mercury, cadmium, bismuth, cobalt, manganese, antimony, iron and the like such as, for example, metal salts of a carboxylic acid having from about 2 to about 20 carbon atoms including, for example, stannous octoate, dibutyltin dilaurate, dibutyltin diacetate, ferric acetylacetonate, lead octoate, lead oleate, phenylmercuric propionate, cobalt naphthenate, lead naphthenate, mixtures thereof and the like.

It is preferred that the catalysts be employed in liquid form. Those catalysts which are not ordinarily liquids may be added as a solution in a solvent which is compatible with the other components employed in the composition of the present invention. Suitable such solvents include, for example, dioctylphthalate, polyoxyalkylene glycols, mineral spirits, dipropylene glycol, mixtures thereof and the like.

In preparing the polyurethanes of the present invention, the components are blended together until the mixture becomes clear and then the resultant mixture is poured into a suitable mold. In blends containing a high equivalent ratio of Component (A1) such as glycerine, to Component (A2), such as dipropylene glycol, the clarity of the catalyzed blend is critical because an insufficient mixing period yields a fluid mix that will segregate after dispensing into the mold which will result in a polymer having poor physical properties. In blends utilizing a high equivalent weight reactive solvent such as adducts of sucrose plus propylene oxide (equivalent weights of about 90 or higher) the degree of mixing or the length of mixing time becomes much less critical due to the improved compatibilizing effects of these polyols with glycerine and polyisocyanates as compared to, for example, dipropylene glycol.

Suitable materials from which adequate molds, for casting the compositions of the present invention, may be prepared include polymers such as, for example, polyethylene, polypropylene, their copolymers and the like, polyurethanes, polysiloxane elastomers, Mylar ®, cured polyepoxides, mixtures thereof and the like.

It is preferred to employ relatively thin wall molds or molds having a low heat capacity or thermal conductivity. Heavy molds made of relatively high thermal conductivity materials such as aluminum, copper, iron or steel and the like may present curing problems, i.e. the reactants may not be readily demolded unless the mold is preheated to about 50°-90° C, especially when casting relatively thin sections. However, high thermal conductivity materials such as copper or aluminum can be employed as thin wall molds without preheating if the thermal capacity of the mold is relatively low compared to the amount of heat liberated in the casting.

Other components including inert fillers such as, for example, sand, microballoons, glass fibers, asbestos, aluminum granules, silicon carbide powder and the like, coloring agents, such as pigments and dyes including, for example, chromic oxide, ferric oxide, fire retardant agents such as, for example, tricresyl phosphate, chloro paraffins, tris(beta chloroethyl) phosphate, tris(2,3-dibromo propyl) phosphate, antimony trioxide mixtures thereof and the like may be employed in the compositions of the present invention without detracting from the scope thereof.

The compositions of the present invention are useful as, but not restricted to such uses as, a casting material for preparing bearing surfaces, annular spacers, decorative objects, furniture or furniture components, gears or other machine components, threaded protective plugs and caps, and the like.

The following examples are illustrative of the present invention.

In each of the following examples and Comparative Experiments, all of the Components of the Compositions were blended together and then the catalyst was added and after through mixing, the resultant mixture was then poured into a mold.

EXAMPLE I

| Blended: | | |
|---|---|---|
| | Isophorone diisocyanate | 80 parts by weight |
| | Dipropylene glycol | 24 parts by weight |
| | Glycerine | 10 parts by weight |
| | Dipropylene glycol dibenzoate | 20 parts by weight |
| | Stannous octoate | 1 part by weight |

After rapidly stirring in the catalyst, this liquid mix was poured into a Mylar ® mold. In about 60 seconds after catalyst addition, a rapid solidification occurred and in less than 120 seconds after catalyst addition, a cast solid polymer sheet was removed from the mold. This rigid cast sheet was found to have a Barcol (No. 934-1 tester) hardness of 37 and a density greater than 1 g/cc.

COMPARATIVE EXPERIMENT A

| Blended: | | |
|---|---|---|
| | Isophorone diisocyanate | 40 parts by weight |
| | Dipropylene glycol | 24 parts by weight |
| | Dipropylene glycol dibenzoate | 20 parts by weight |
| | Stannous octoate | 0.5 parts by weight |

After mix was then cast into a Mylar ® tray. Five minutes after catalyst addition, this mix did not solidify but was a viscous liquid. Seven minutes after catalyst addition, no solidification had occurred, but the liquid had increased in viscosity.

Ten minutes after catalyst addition, this mix was a tacky substance incapable of being demolded.

COMPARATIVE EXPERIMENT B

| Blended: | | |
|---|---|---|
| | Isophorone diisocyanate | 40 parts by weight |
| | Glycerine | 10 parts by weight |
| | Dipropylene glycol dibenzoate | 10 parts by weight |
| | Stannous octoate | 0.5 parts by weight |

This blend was also cast into a Mylar ® tray. At 30 minutes after stirring in the catalyst, this blend was still a pourable liquid.

EXAMPLE 2

| Blended: | | |
|---|---|---|
| | Polymethylene polyphenyl isocyanate having an average functionality of about 2.7 and an average NCO equivalent weight of about 133. | 90 parts by weight |
| | Glycerine | 10 parts by weight |
| | Adduct of glycerine and propylene oxide to an average molecular weight of about 260 (hereinafter referred to as Polyol A) | 30 parts by weight |
| | Dipropylene glycol dibenzoate | 20 parts by weight |
| | Stannous octoate | 1 part by weight |

Cast this blend into a Mylar ® tray and found that sudden solidification occurred about 45 seconds after catalyst addition. The cast resin sheet was removed from the mold in less than 90 sec. after catalyst addition and was found to have a density of >1 gram/cc, a Barcol Hardness (No. 934-1 tester) of approximately 48 and a Tensile strength of 13,026 psi at 8% elongation.

EXAMPLE 3

| Blended: | Polyol A | 30 grams |
|---|---|---|
| | Glycerine | 10 grams |
| | 80/20 mixture by weight of 2,4-/2,6-toluene diisocyanate (hereinafter referred to as 80/20 TDI) | 60 grams |
| | Dioctylphthalate (hereinafter referred to as DOP) | 30 grams |
| | Lead Octoate (24% Pb) | 0.4 cc |

Poured the stirred mix into a Mylar ® tray and observed that sudden solidification occurred in less than 20 seconds after catalyst addition. A rigid opaque white cast sheet was demolded within 60 seconds after catalyst addition and was found to have a density greater than 1 g/cc.

COMPARATIVE EXPERIMENT C

| Blended: | Polyol A | 30 grams |
|---|---|---|
| | DOP | 30 grams |
| | 80/20 TDI | 30 grams |
| | Lead octoate (24 Pb) | 0.4 cc |

Poured this stirred mix into a Mylar ® tray and observed sudden solidification to occur about 20 seconds after catalyst addition. Removed the opaque white cast resin sheet from the Mylar ® mold in about 60 seconds after catalyst addition.

Cut a ¼ × ¼ × ¼ inch section from Example No. 3 and comparative Example C and subjected these samples to a thermomechanical stress in the Thermomechanical Analyzer (duPont No. 990 Thermal Analyzer with No. 942 Thermomechanical Analyzer module) for characteristic deflections corresponding to heat distortion temperatures of plastics.

| Test Sample | Distortion Temp. |
|---|---|
| Comparative Experiment C | 90° C |
| Example 3 | 142° C |

EXAMPLE 4

| Blended: | Glycerine | 10.5 grams |
|---|---|---|
| | Tripropylene glycol | 33.5 grams |
| | DOP | 40 grams |
| | 80/20 TDI | 60 grams |
| | Lead Octoate | 0.1 cc |

Cast this blend into a Mylar ® tray and observed that instant solidification occurred about 20 seconds after catalyst addition. An opaque white sheet was demolded within about 60 seconds after catalyst addition. This cast sheet was found to have a tensile strength of 7804 psi at an elongation of 7%.

EXAMPLE 5

| Blended: | Adduct of glycerine and propylene oxide to average molecular weight of about 450 (average OH equivalent weight of about 150) | 60 grams |
|---|---|---|
| | Glycerine | 10 grams |
| | 80/20 TDI | 60 grams |
| | DOP | 20 grams |
| | Lead Octoate | 0.2 cc |

Cast this blend into a Mylar ® tray and observed sudden solidification to occur in about 10 seconds after catalyst addition. A translucent sheet was demolded in less than 2 minutes after catalyst addition. This resin product was found to have the following properties:

| Density | >1 g/cc |
|---|---|
| Barcol Hardness | >98 (No. 935 Tester) |
| Tensile strength | 9,111 psi at 11% elongation |

EXAMPLE 6

| Blended: | Adduct of sucrose with propylene oxide to an average equivalent number of about 160 | 60 grams |
|---|---|---|
| | Glycerine | 10 grams |
| | DOP | 30 grams |
| | 80/20 TDI | 60 grams |
| | Lead Octoate (24% Pb) | 0.1 cc |

This liquid blend was cast into a Mylar ® tray and was found to instantly solidify in about 10 seconds after catalyst addition. Properties of this sheet was found to be:

| Density | >1 g/cc |
|---|---|
| Barcol Hardness | >98 (No. 935 tester) |
| Tensile strength | 7,916 psi at 9% elongation |

EXAMPLE 7

| Blended: | Dipropylene Glycol | 32.6 grams |
|---|---|---|
| | Glycerine | 7.3 grams |
| | DOP | 40 grams |
| | Prepolymer prepared from 80/20 TDI and Polyol A having 30% free NCO groups | 90 grams |
| | Stannous octoate | 0.6 cc |

Cast this blend into a Mylar ® tray; sudden solidification occurred about 20 seconds after catalyst addition. Removed the cast sheet in less than 90 seconds after catalyst addition. This opaque rigid sheet product was found to have a density greater than 1 g/cc and a Barcol Hardness (No. 935 tester) of 92 whereas Comparative Example C showed a hardness of about 70.

EXAMPLE 8

| Blended: | Glycerine | 10 grams |
|---|---|---|
| | Dipropylene glycol | 24 grams |
| | DOP | 30 grams |
| | Prepolymer prepared from 80/20 TDI and Polyol A having 30% free NCO groups | 90 grams |
| | Lead Octoate (24% Pb) | 0.5 cc |

Cast this blend into a Mylar ® tray and observed sudden solidification in about 20 seconds after catalyst addition. Cast sheet was removed from the mold in about 60 seconds after catalyst addition. This sheet had a density >1 g/cc and a Barcol Hardness (No. 935 tester) approximately 94.

COMPARATIVE EXPERIMENT D

| Blended: | Glycerine | 10 grams |
|---|---|---|
| | Dipropylene glycol | 24 grams |
| | Prepolymer prepared from 80/20 TDI and Polyol A having 30% free NCO groups | 90 grams |
| | Lead Octoate (24% Pb) | 0.5 cc |

Cast this blend into a Mylar ® tray; the liquid reactants on polymerization bubbled up to yield a cellular rigid plastic having a density of about 0.4 g/cc.

EXAMPLE 9

| Blended: | 80/20 TDI | 90 grams |
|---|---|---|
| | DOP | 40 grams |
| | Glycerine | 10 grams |
| | Dipropylene Glycol | 48 grams |
| | Lead Octoate | 0.5 cc |

Cast this blend into a Mylar ® tray and observed sudden solidification in less than 30 seconds after catalyst addition. This rigid opaque sheet resin was found to exhibit a Barcol Hardness (No. 935 tester) greater than 97 and a density greater than 1 g/cc, and a tensile strength of 12,375 psi at 10% elongation.

COMPARATIVE EXPERIMENT E

| Blended: | TDI | 30 grams |
|---|---|---|
| | Glycerine | 5 grams |
| | Adduct of glycerine with ethylene oxide having an average molecular weight of about 228 (an average OH equivalent weight of about 76) | 14 grams |
| | DOP | 20 grams |
| | Lead Octoate | ½ cc |

This blend suddenly solidified in a Mylar ® tray in less than 30 seconds after catalyst addition but the solid product was porous, nonhomogenous, and mechanically weak (easily crumbled between the fingers).

COMPARATIVE EXPERIMENT F

| Blended: | 80/20 TDI | 30 grams |
|---|---|---|
| | Glycerine | 5 grams |
| | 1,3-Butylene glycol | 8 grams |
| | DOP | 20 grams |
| | Lead Octoate | 0.5 cc |

Sudden solidification of this blend in a Mylar ® tray occurred in less than 30 seconds after catalyst addition. The opaque white solid was found to be porous, nonhomogenous, and mechanically weak.

COMPARATIVE EXPERIMENT G

| Blended: | Glycerine | 5 grams |
|---|---|---|
| | Ethylene glycol | 5 grams |
| | DOP | 20 grams |
| | 80/20 TDI | 30 grams |
| | Lead octoate | 0.5 cc |

This cast liquid blend exhibited no homogeneous solidification within 6 minutes after catalyst addition. At 8 minutes after catalyst addition this cast material was found to have separated into two phases: a liquid mass and a soft semi-solid.

COMPARATIVE EXPERIMENT H

| Blended: | Glycerine | 20 grams |
|---|---|---|
| | Adduct of glycerine with propylene oxide to an average molecular weight of about 700 (average OH equivalent weight was about 233) | 40 grams |
| | DOP | 40 grams |
| | 80/20 TDI | 60 grams |
| | Lead octoate | 1 cc |

At about 9 minutes after catalyst addition, this blend has not yet solidified. Instead it has separated into 2 phases: a liquid phase and a foamy soft gel phase.

EXAMPLE 10

| Blended: | Trimethylol propane | 7.62 grams |
|---|---|---|
| | Polyoxypropylene glycol having an average equivalent weight of about 150 | 25.38 grams |
| | DOP | 30 grams |
| | 80/20 TDI | 30 grams |
| | Lead octoate (24% Pb) | 1 gram |

The mixture was poured into a polyethylene beaker. Within about 30 seconds catalyst addition, the mixture suddenly solidified and was demolded within about 60 seconds after catalyst additions. The rigid, white casting had a density of >1 g/cc. The identical formulation was poured into a Mylar ® tray and was found to have a tensile strength of about 4761 psi at an elongation of 8%.

COMPARATIVE EXPERIMENT I

| Blended: | Trimethylol propane | 15 grams |
|---|---|---|
| | DOP | 30 grams |
| | 80/20 TDI | 30 grams |
| | Lead octoate (24% Pb) | 1 gram |

The mixture was poured into a polyethylene beaker and was still a pourable liquid 3 hours after catalyst addition.

COMPARATIVE EXPERIMENT J

| Blended: | Trimethylol propane | 7.62 grams |
|---|---|---|
| | Polyoxypropylene glycol having an equivalent weight of about 150 | 25.38 grams |
| | 80/20 TDI | 30 grams |
| | Lead octoate (24% Pb) | 1 gram |

The mixture was poured into a polyethylene beaker. The mixture appeared to suddenly solidify within about 30 seconds after catalyst addition; however, during the next minute, the contents of the beaker swelled and cracked to yield a distorted, swollen solid having a density of 0.4/g/cc.

EXAMPLE 11

| Blended: | 1,2,6-hexanetriol | 15 grams |
|---|---|---|
| | Dipropylene glycol | 24 grams |
| | DOP | 30 grams |
| | 80/20 TDI | 60 grams |
| | Stannous octoate | 0.2 cc |

The mixture was poured into a Mylar ® tray wherein it suddenly solidified within about 15 seconds after catalyst addition and was demolded within about 60 seconds after catalyst addition. The resultant rigid cast sheet had a density of >1g/cc and a tensile strength of 6395 at an elongation of 12%.

COMPARATIVE EXPERIMENT K

| Blended: | 1,2,6-hexanetriol | 30 grams |
|---|---|---|
| | DOP | 30 grams |
| | 80/20 TDI | 60 grams |
| | Stannous octoate | 0.2 grams |

The mixture was poured into a Mylar ® tray and 50 minutes after catalyst addition the mixture was still a pourable liquid.

EXAMPLE 12

| Blended: | 1,2,6-hexanetriol | 7 grams |
|---|---|---|
| | Polyol A | 15 grams |
| | Diisodecyl phthalate | 20 grams |
| | 80/20 TDI | 30 grams |
| | Antimony octoate | 1 gram |

The mixture was poured into a polyethylene beaker. The mixture suddenly solidified within about 40 seconds after catalyst addition and was demolded within about 60 seconds after catalyst addition. The resultant casting had a density of >1g/cc.

EXAMPLE 13

| Blended: | Glycerine | 5 grams |
|---|---|---|
| | Polyol A | 15 grams |
| | Diisodecyl phthalate | 20 grams |
| | Polymethylene polyphenyl-isocyanate having an NCO equivalent weight of about 133 | 46 grams |
| | Dibutyl tin dilaurate | 1 gram |

The mixture was cast into a 250 cc polyethylene beaker. The mixture suddenly solidified within about 35 seconds after catalyst addition and was demolded within about 60 seconds after catalyst addition. The solid, rigid, khaki-colored object had a density greater than 1g/cc.

We claim:

1. A non-elastomeric non-cellular product having a density of at least about 1 gram/cc which is demoldable within about 5 minutes after admixture of the components of a composition which is the reaction product of a polyurethane-forming composition comprising:
   A. a polyol component consisting of
      1. a liquid monomeric aliphatic triol having from 3 to about 6 carbon atoms or mixtures thereof and
      2. a liquid propylene oxide derivative having at least 2 hydroxyl groups and an OH equivalent weight of less than about 230 or mixtures thereof, wherein Components (A1) and (A2) are present in quantities such that the hydroxyl equivalent ratio of (A1): (A2) is from about 0.25:1 to about 2:1;
   B. an organic polyisocyanate;
   C. as a modifier substance a liquid ester of a carboxylic acid or mixtures thereof, said modifier having a boiling point above about 150° C;
   D. a non-amine containing catalyst for urethane formation;

wherein Components (A) and (B) are present in quantities so as to provide an NCO:OH equivalent ratio of from about 0.8:1 to about 1.5:1; Component (C) is present in quantities of from about 10% to about 40% by weight based upon the sum of the weights of Components (A), (B) and (C); and Component (D) is present in quantities of from about 0.001% to about 2% by weight based upon the sum of the weights of Components (A), (B) and (C).

2. The product of claim 1 wherein Components (A1) and (A2) are present in quantities so as to provide a hydroxyl equivalent ratio of (A1):(A2) of from about 0.5:1 to about 1:1; Components (A) and (B) are present in quantities such that the NCO:OH equivalent ratio is from about 0.95:1 to about 1.25:1; Component (C) is present in quantities of from about 15% to about 30% and Component (D) is present in quantities of from about .05 to about 1%.

3. The product of claim 2 wherein Component (A2) is dipropylene glycol, tripropylene glycol, an adduct of propylene oxide with glycerine, propylene glycol, trimethylol propane, sucrose, or hexametriol or mixtures thereof.

4. The product of claim 3 wherein Component (A1) is glycerine, trimethylol propane or hexanetriol.

5. The product of claim 4 wherein Component (A2) is an adduct of glycerine and propylene oxide.

6. The product of claim 5 wherein Component (A1) is glycerine.

7. The product of claim 4 wherein Component (A2) is an adduct of sucrose and propylene oxide.

8. The product of claim 7 wherein Component (A1) is glycerine.

9. The product of claim 1 cast in the form of a machine component.

10. The product of claim 1 cast as a furniture component.

* * * * *